Figures 6, 8:
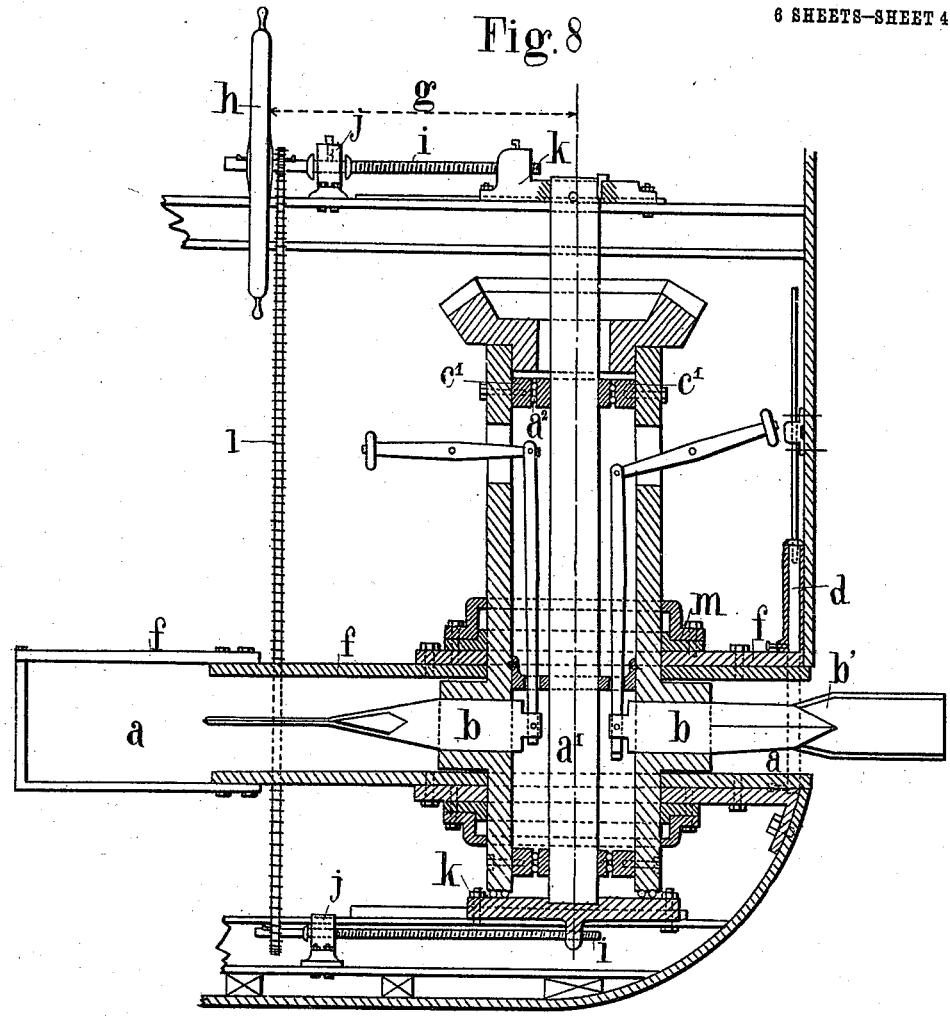

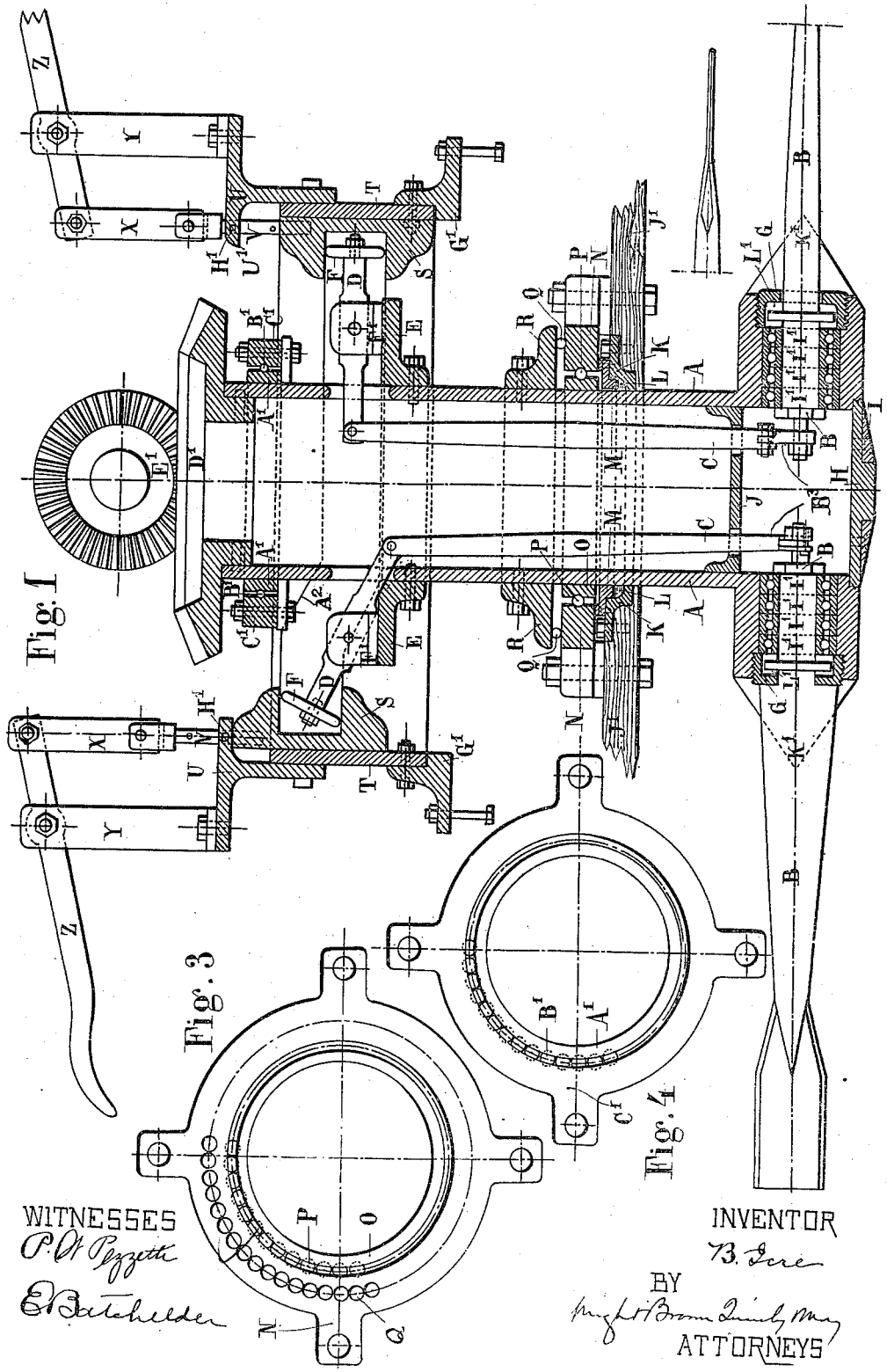

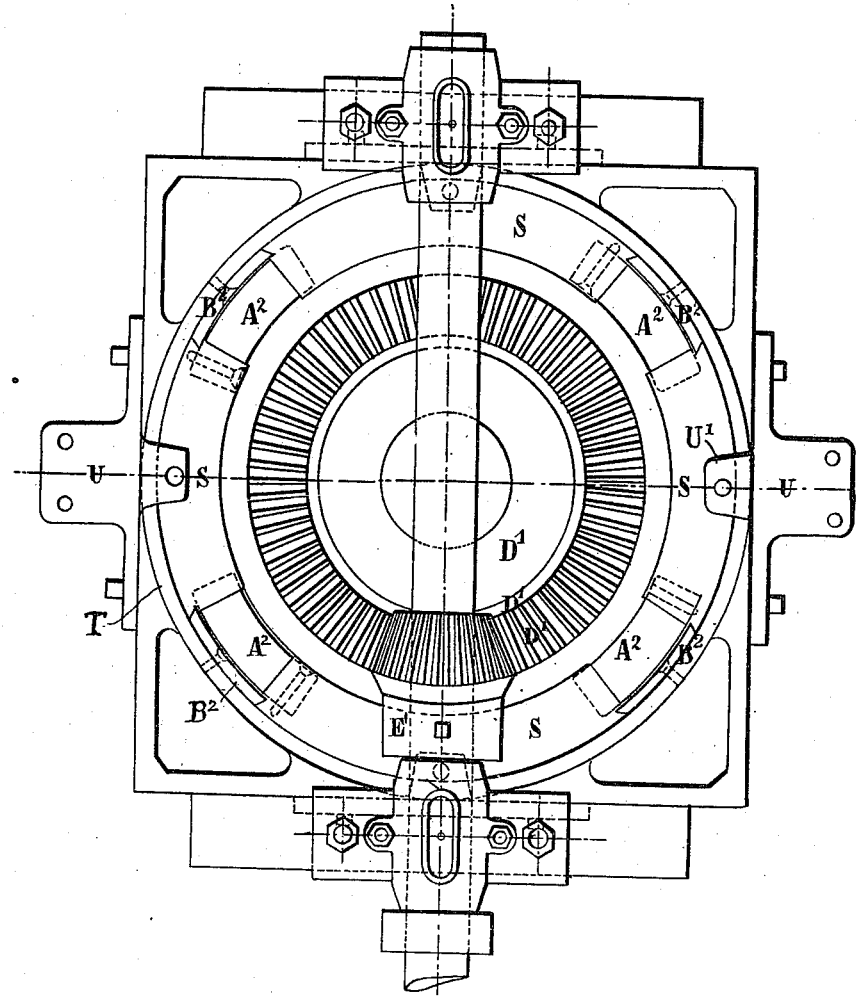

B. ICRE.
PROPELLER FOR MARITIME AND RIVER NAVIGATION.
APPLICATION FILED MAY 4, 1910.
976,178.
Patented Nov. 22, 1910.
6 SHEETS—SHEET 3.
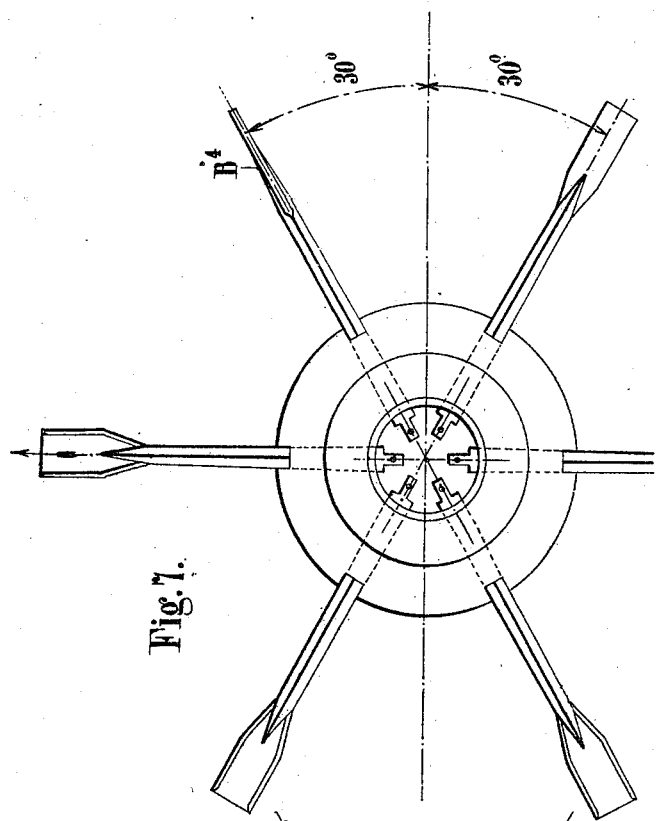
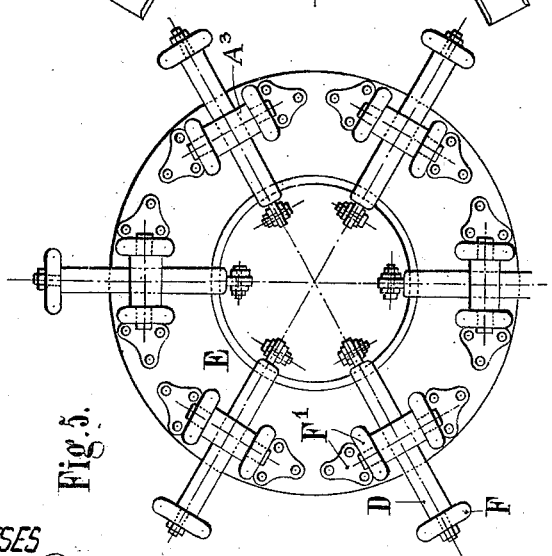

B. ICRE.
PROPELLER FOR MARITIME AND RIVER NAVIGATION.
APPLICATION FILED MAY 4, 1910.

976,178.

Patented Nov. 22, 1910.

6 SHEETS—SHEET 4.

WITNESSES

INVENTOR

BY

ATTORNEYS

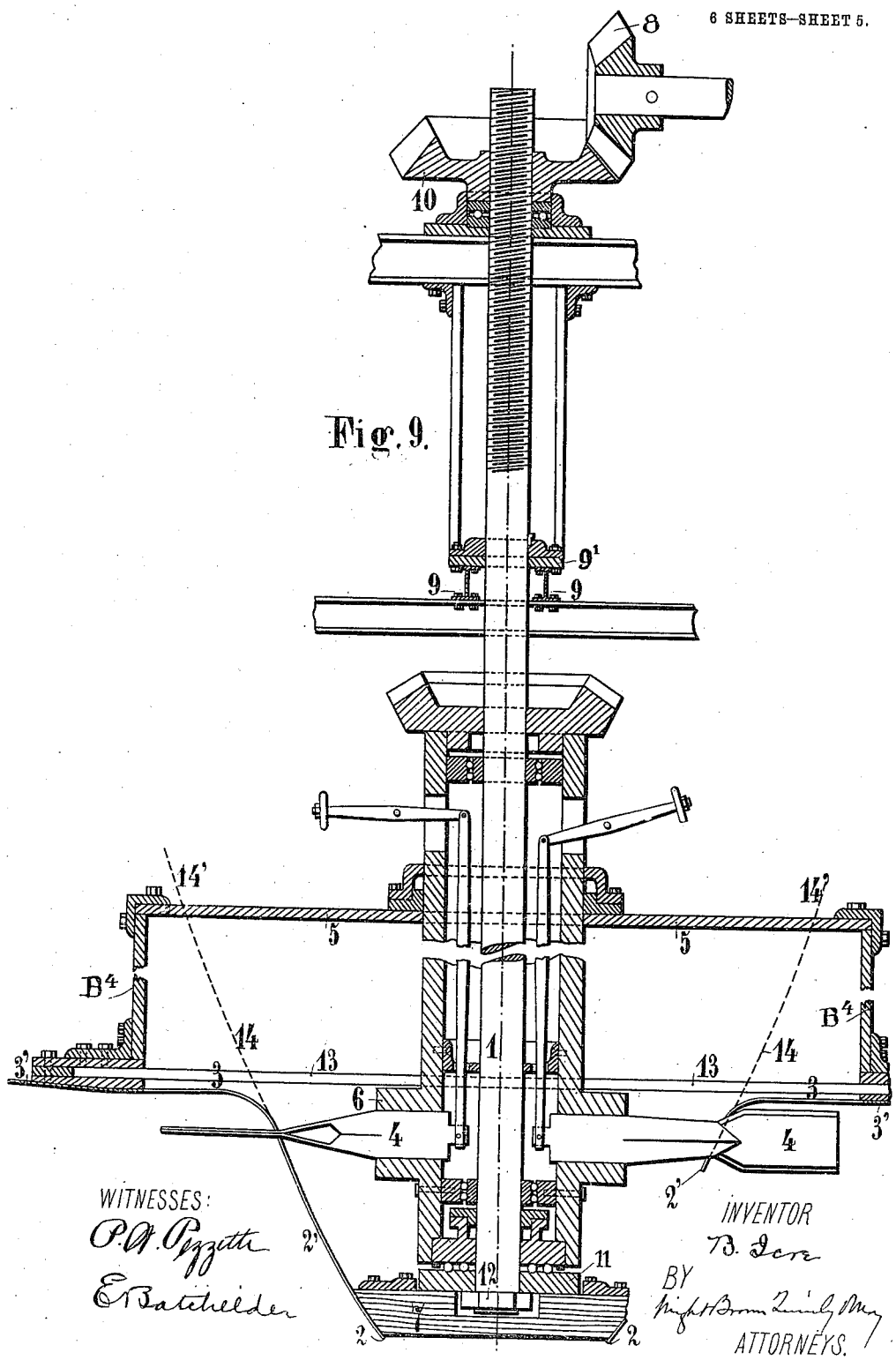

B. ICRE.
PROPELLER FOR MARITIME AND RIVER NAVIGATION.
APPLICATION FILED MAY 4, 1910.
976,178.
Patented Nov. 22, 1910.
6 SHEETS—SHEET 6.
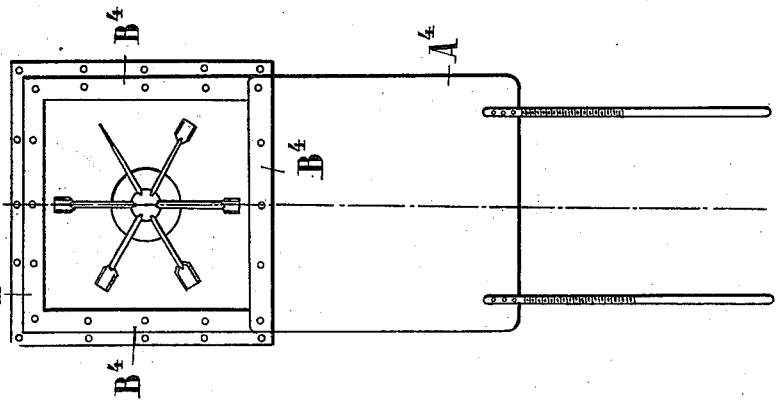
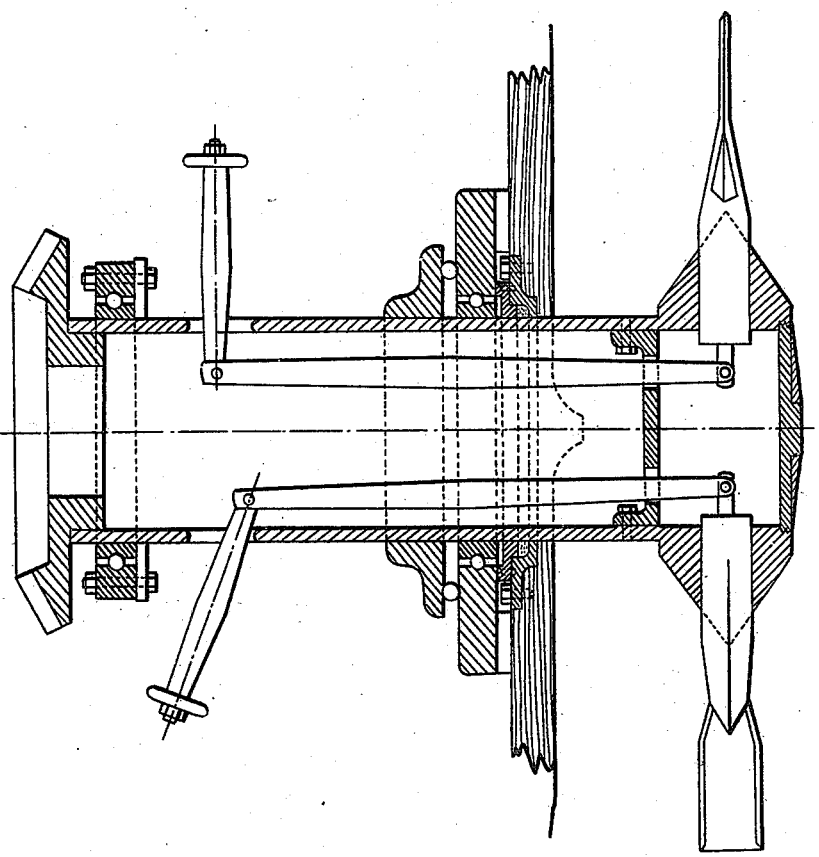
WITNESSES
INVENTOR
BY
ATTORNEYS

UNITED STATES PATENT OFFICE.

BAPTISTE ICRE, OF NEW YORK, N. Y.

PROPELLER FOR MARITIME AND RIVER NAVIGATION.

976,178.  Specification of Letters Patent.  Patented Nov. 22, 1910.

Application filed May 4, 1910.  Serial No. 559,323.

*To all whom it may concern:*

Be it known that I, BAPTISTE ICRE, a citizen of the Republic of France, and resident of New York, N. Y., United States of America, have invented new and useful Improvements in and Relating to Propellers for Maritime and River Navigation, which improvements are fully set forth in the following specification.
This invention relates to propellers for marine vessels, and has particular reference to that type employing feathering blades which rotate in a horizontal plane.

One of the objects of the invention is to provide an improved propeller structure having means whereby the degree and time of feathering of the individual blades may be adjusted.

Further objects are to provide the grooved details of construction as will be more fully hereinafter described.

Of the accompanying drawings, forming a part of this specification,—Figure 1 is a vertical section representing my improved structure in one of its embodiments. Fig. 2 is a plan view of the same, the levers for adjusting the cam track sections being omitted. Figs. 3 and 4 are detail plan views of ball bearings shown in Fig. 1. Fig. 5 is a detail plan view of the levers which actuate the blades in their feathering motion. Fig. 6 is a detail elevation of one of the lever bearings. Fig. 7 is a detail plan view of the blades. Fig. 8 is a vertical section of a modified structure, adapted to operate at the side of a vessel, instead of underneath. Fig. 9 is a vertical section representing other modifications, said figure chiefly illustrating a structure which will enable the blades to be elevated into a chamber in the bottom of the hull of a vessel. Fig. 10 is a detail plan view of the devices utilized to close the chamber in the bottom of the vessel when a structure is employed such as shown in Fig. 9, the said Fig. 10 being drawn to a smaller scale than Fig. 9. Fig. 11 represents a vertical section of a structure similar to Fig. 1, but designed especially for small vessels, such as tugs and yachts.
Similar reference characters indicate the same, or similar parts, in all of the views.

Referring first to Figs. 1, 2, 3, 4, and 5, a hollow shaft A is mounted to rotate on a vertical axis, the said shaft projecting downwardly through the bottom J' of the vessel. It is held in vertical position by upper and lower ball bearings. The upper ball bearing comprises a ring A' carried by the shaft, an outer ring C' suitably secured within the vessel, and interposed balls B'. The lower ball bearing comprises a ring O carried by the shaft, an outer ring N suitably secured to the bottom of the hull of the vessel, and interposed balls P. To support the weight of the shaft and parts carried thereby, a ring R is secured to the shaft, said ring having a flat under surface between which and the top of the ring N are balls Q. Below the lower ball bearing is secured suitable packing L, confined between rings K and N.

Above the ring R is a collar E which is secured to the shaft, said collar supporting bearings F' for the fulcrums of levers D, which have rollers F at their outer ends. Said levers D extend through openings in the hollow shaft and their inner ends are connected by links C to the blades to rotatively actuate said blades on their axes, as presently described, said links C passing through openings in a transverse web J of the hollow shaft.

The blades B have their shanks mounted in ball bearings I', carried by the enlargement K' at the lower end of the shaft. Suitable packing L' is employed to prevent access of water to the interior of the hollow shaft, said packing being held by screw caps G. The lower end of the hollow shaft is closed by a plate H, to which is secured a cone ring I, the said plate and ring forming a slightly convex lower end of the shaft which will present no material obstruction to the passage of the vessel through the water. For the same purpose of avoiding obstruction to passage through the water, the enlargement K' of the shaft is beveled around its periphery. To the upper end of the hollow shaft is secured a gear D' which meshes with a driving pinion E'.

A ring G' is suitably fixed within the vessel and supports a circular frame T, to the inner wall of which are secured guides B² (see Fig. 2) for the sections S of the cam track along which the rollers F travel. Said sections S have intermediate connecting sections A², each of which at one end is pivotally connected with a section S, and at the other end intermeshes with an end of a section S so that when either section S is vertically adjusted, the sections A² can move to a degree required by the amount of adjustment, and still preserve the continuity of the cam track. Connected with the upper edge of each section S is a rod V having transverse holes, as shown in Fig. 1, each rod passing through an opening in a guide lug U'. The guide lugs U' project inward from a flange U, which latter is secured to the frame T. Rising from the flange U are fulcrum brackets Y, in which are pivoted hand levers Z, the latter being connected by links X with the rods V. When a section S has been adjusted, a pin may be passed through a hole H' in the lug U' and into one of the transverse holes of the rod V. Each link C at its lower end is connected to a crank B³ secured to the shank of a blade, and consequently, as the hollow shaft is driven and the rollers F travel around the cam track, the levers D are oscillated so as to shift the blades from horizontal to vertical planes. By adjusting different sections of the cam track, the blades are caused to take their vertical positions to act best upon the water at such portions of their movements around the axis of the hollow shaft as may be desired to effect movement of the vessel in a particular direction, whether ahead or astern, or laterally, this being done without reversing the direction of the rotation of the hollow shaft.

In Figs. 5 and 6, each bearing F' is shown as having pivotally mounted therein a sleeve A³ through which the lever D passes. In Fig. 8 I illustrate a structure which, in general, is similar to what has been described in connection with Fig. 1, but the blades being designed to operate in a chamber $a$ provided in the hull of the vessel, said chamber opening at the side, and through which opening the blades $b$ act on the water. The shanks $b$ of the blades are rotatively mounted and are controlled in the same manner as described in connection with Fig. 1. The casing of the chamber is formed in two parts, capable of sliding one relatively to the other. A vertical guide rod or shaft $a'$ has its upper and lower ends carried by slides $k$, said slides having lugs which are internally threaded to receive screw shafts $i$ which are mounted in fixed bearings $j$. The two shafts are provided with pinions connected by a chain $l$, and one of the shafts has a hand wheel $h$. By operating the hand wheel $h$ the rod or shaft $a'$ is shifted in the direction of the dotted line $g$.

The hollow shaft rotates about the guide rod $a'$, suitable ball bearings being provided, as indicated at $c'$ and $a^2$. When the mechanism is withdrawn into the vessel by the operation of the hand-wheel $h$, as described, the chamber $a$ may be closed by means of a suitable gate $d$, after which the upper part or cover $f$ of the chamber may be removed so that access may be had to the blades to repair them.

In Fig. 9 there is a guide rod or shaft 1, the upper end of which is threaded, a nut 10 being mounted on the threaded portion of said rod. The nut 10 is toothed, and a pinion 8 meshes therewith. The nut 10 is so supported that when the pinion 8 is actuated in one direction, the rod 1 may be raised, and, owing to a nut 12 at the lower end of the rod, the step 11 may be raised from the keelson 7 and with it the hollow shaft and the blades elevated within the chamber in the bottom of the hull of the vessel, the cover of said chamber being indicated at 5. The blades are indicated at 4, said blades being mounted in bearings 6 of the hollow shaft.

The lines 2', 3 and 3', indicate the lines of one form of vessel hull with which this mechanism may be employed, the lines 14, 14', indicating another form of bottom of the hull, but in the latter case, the blades could not be elevated entirely within a chamber in the hull.

The shaft or rod 1 may be steadied by means of a guide 9', supported by the beam structure 9.

When the blades are elevated within the chamber under the cover 5, a blade $a^4$ (see Fig. 10) may be adjusted along the ways 13 to close the bottom of the chamber, said ways being formed in the frame $b^4$, after which the cover 5 may be removed to give access to the blades to repair them.

Fig. 11 illustrates parts of a structure practically the same as in Fig. 1, but made smaller, or relatively small, for use in vessels such as tugs and yachts.

I claim:

1. A propeller comprising a hollow shaft having openings, means for rotating the shaft, a collar carried by the shaft and having bearings, a cam track surrounding the shaft, levers mounted in said bearings and projecting inwardly through said openings, their outer ends extending into engagement with the cam track, blades carried by said shaft and rotatively mounted therein, and connections between said levers and blades whereby the angular positions of the blades are controlled by said cam.

2. A propeller comprising a hollow shaft having openings, means for rotating the shaft, a collar carried by the shaft and having bearings, a cam track surrounding the shaft, levers mounted in said bearings and projecting inwardly through said openings, rollers mounted on the outer ends of the levers and engaging said cam track, blades carried by said shaft and rotatably mounted therein, the shanks of said blades having cranks, and links connecting said cranks and levers.

3. A propeller comprising a hollow shaft having openings, means for rotating the shaft, a collar carried by the shaft and having bearings, a sectional cam track surrounding the shaft, means for varying the height of different sections of said cam track, levers mounted in said bearings and projecting inwardly through said openings, their outer ends extending into engagement with the cam track, blades carried by said shaft and rotatively mounted therein, and connections between said levers and blades whereby the angular positions of the blades are controlled by said cam.

4. A propeller comprising a hollow shaft having openings, means for rotating the shaft, a collar carried by the shaft and having bearings, a frame surrounding said bearings and having vertical guides, a cam track comprising sections fitting said guides and intermediate sections connected with the guided sections, levers mounted in said bearings and projecting inwardly through said openings, their outer ends extending into engagement with the cam track, blades carried by said shaft and rotatively mounted therein, and connections between said levers and blades whereby the angular positions of the blades are controlled by said cam.

In testimony whereof I have signed this specification in the presence of two subscribing witnesses.

BAPTISTE ICRE.

Witnesses:
 DEMOGET GASTON,
 DEAN B. MASON.